(12) United States Patent
Hart

(10) Patent No.: US 10,543,542 B2
(45) Date of Patent: Jan. 28, 2020

(54) MITER SAW

(71) Applicant: TTI (MACAO COMMERCIAL OFFSHORE) LIMITED, Macau (MO)

(72) Inventor: Michael Hart, Anderson, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 15/659,842

(22) Filed: Jul. 26, 2017

(65) Prior Publication Data

US 2018/0029146 A1 Feb. 1, 2018

Related U.S. Application Data

(60) Provisional application No. 62/367,195, filed on Jul. 27, 2016.

(51) Int. Cl.
*B23D 45/04* (2006.01)
*B27B 5/20* (2006.01)
*B27G 19/02* (2006.01)

(52) U.S. Cl.
CPC ......... *B23D 45/048* (2013.01); *B23D 45/044* (2013.01); *B27B 5/20* (2013.01);
(Continued)

(58) Field of Classification Search
CPC .. B23D 45/044; B23D 45/048; B23D 47/025; Y10T 83/7697; Y10T 83/7788; Y10T 83/8773; Y10T 83/7705
See application file for complete search history.

(56) References Cited

U.S. PATENT DOCUMENTS 5,357,834 A 10/1994 Ito et al.
D390,766 S * 2/1998 Price ........................... D15/133
(Continued)

FOREIGN PATENT DOCUMENTS

CN 204295054 U 4/2015
DE 29814706 U1 12/1998
(Continued)

OTHER PUBLICATIONS

European Patent Office Search Report for Application No. 17183640.6 dated Dec. 7, 2017, 16 pages.
(Continued)

*Primary Examiner* — Laura M Lee
(74) *Attorney, Agent, or Firm* — Michael Best & Friedrich LLP

(57) ABSTRACT

A miter saw includes a base assembly, a bevel arm pivotably coupled to the base assembly, and a saw unit pivotably coupled to the bevel arm about a horizontal chop axis. The saw unit includes a saw blade rotatable about a blade axis and a motor having an output shaft inclined at an oblique included angle relative to the blade axis. The miter saw also includes a guide rail coupling the saw unit to the base assembly and a battery selectively electrically connectable with the motor to provide power to the motor. The bevel arm and saw unit are pivotable relative to the base assembly, from an orientation in which the saw blade is substantially vertical, in both a first direction about the bevel axis by a bevel angle of at least about 45 degrees and an opposite, second direction by a bevel angle of at least about 45 degrees.

19 Claims, 6 Drawing Sheets

(52) U.S. Cl.
CPC ........... *B27G 19/02* (2013.01); *Y10T 83/7697* (2015.04); *Y10T 83/7705* (2015.04); *Y10T 83/8773* (2015.04)

(56) References Cited

U.S. PATENT DOCUMENTS

| | | | | |
|---|---|---|---|---|
| 6,418,830 | B1 * | 7/2002 | Stumpf | B27B 27/00 83/468.2 |
| 6,523,447 | B2 | 2/2003 | Judge | |
| 6,658,976 | B2 * | 12/2003 | Dils | B23D 45/044 83/471.3 |
| D490,826 | S * | 6/2004 | Wu | D15/133 |
| 6,763,751 | B2 | 7/2004 | Judge | |
| 6,769,338 | B2 * | 8/2004 | Svetlik | B23D 45/044 144/216 |
| 7,552,666 | B2 * | 6/2009 | Liu | B23D 45/042 83/471.3 |
| RE41,320 | E * | 5/2010 | Lo | B23D 45/044 83/473 |
| 7,770,501 | B2 | 8/2010 | Ozawa et al. | |
| 8,495,940 | B2 * | 7/2013 | Abe | B23D 45/042 30/388 |
| 8,677,633 | B2 * | 3/2014 | Holly | B23D 53/12 30/380 |
| 8,752,644 | B2 * | 6/2014 | Weusthof | B27B 5/29 173/170 |
| 9,962,852 | B2 * | 5/2018 | Cleanthous | B27B 5/29 |
| 10,286,462 | B2 * | 5/2019 | Nishikawa | B23D 45/04 |
| 2005/0257656 | A1 * | 11/2005 | Shibata | B23D 45/044 83/471.3 |
| 2005/0257686 | A1 * | 11/2005 | Occhialini | B01D 53/047 95/96 |
| 2006/0101967 | A1 * | 5/2006 | Garcia | B23D 45/044 83/473 |
| 2015/0375313 | A1 * | 12/2015 | Kani | B23D 45/048 83/471.2 |
| 2016/0199923 | A1 * | 7/2016 | Dutterer | B23D 45/14 83/471.3 |
| 2016/0243631 | A1 * | 8/2016 | Brewster | B23D 45/048 |
| 2016/0273708 | A1 * | 9/2016 | Voong | F16P 3/148 |
| 2017/0120353 | A1 * | 5/2017 | Tennant | B23D 45/048 |
| 2017/0120435 | A1 * | 5/2017 | Palich | B25F 5/008 |
| 2019/0262916 | A1 * | 8/2019 | Nishikawa | B23D 45/04 |

FOREIGN PATENT DOCUMENTS

| | | | |
|---|---|---|---|
| DE | 202015000495 | 2/2015 | |
| EP | 2113327 A1 | 11/2009 | |
| JP | 2000308268 A | 11/2000 | |
| JP | 2014-161970 | * 9/2014 | ............ B23D 47/02 |

OTHER PUBLICATIONS

Australian Patent Office Examination Report for Application No. 2017208318 dated Apr. 6, 2018, 3 pages.

Extended European Search Report for European Application No. 17183640.6, dated Apr. 9, 2018, 19 pages.

* cited by examiner

1

MITER SAW

CROSS-REFERENCE TO RELATED APPLICATIONS

This application claims priority to U.S. Provisional Patent Application No. 62/367,195 filed Jul. 27, 2016, the entire content of which is incorporated by reference herein.

FIELD OF THE INVENTION

The present invention relates to power tools, and more particularly to miter saws.

SUMMARY OF THE INVENTION

The invention provides, in one aspect, a miter saw including a base assembly having a support surface operable to support a work piece, a bevel arm pivotably coupled to the base assembly about a horizontal bevel axis, and a saw unit pivotably coupled to the bevel arm about a horizontal chop axis. The saw unit includes a saw blade rotatable about a blade axis parallel with the chop axis and operable to cut the work piece, a motor having an output shaft inclined at an oblique included angle relative to the blade axis, and a motor housing in which the motor is supported. The miter saw also includes at least one guide rail coupling the saw unit to the base assembly to permit the saw unit to slide relative to the base assembly in the direction of the bevel axis, and a battery supported by the motor housing and selectively electrically connectable with the motor to provide power to the motor. The bevel arm and saw unit are pivotable relative to the base assembly, from an orientation in which the saw blade is substantially vertical, in both a first direction about the bevel axis by a bevel angle of at least about 45 degrees and an opposite, second direction by a bevel angle of at least about 45 degrees.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
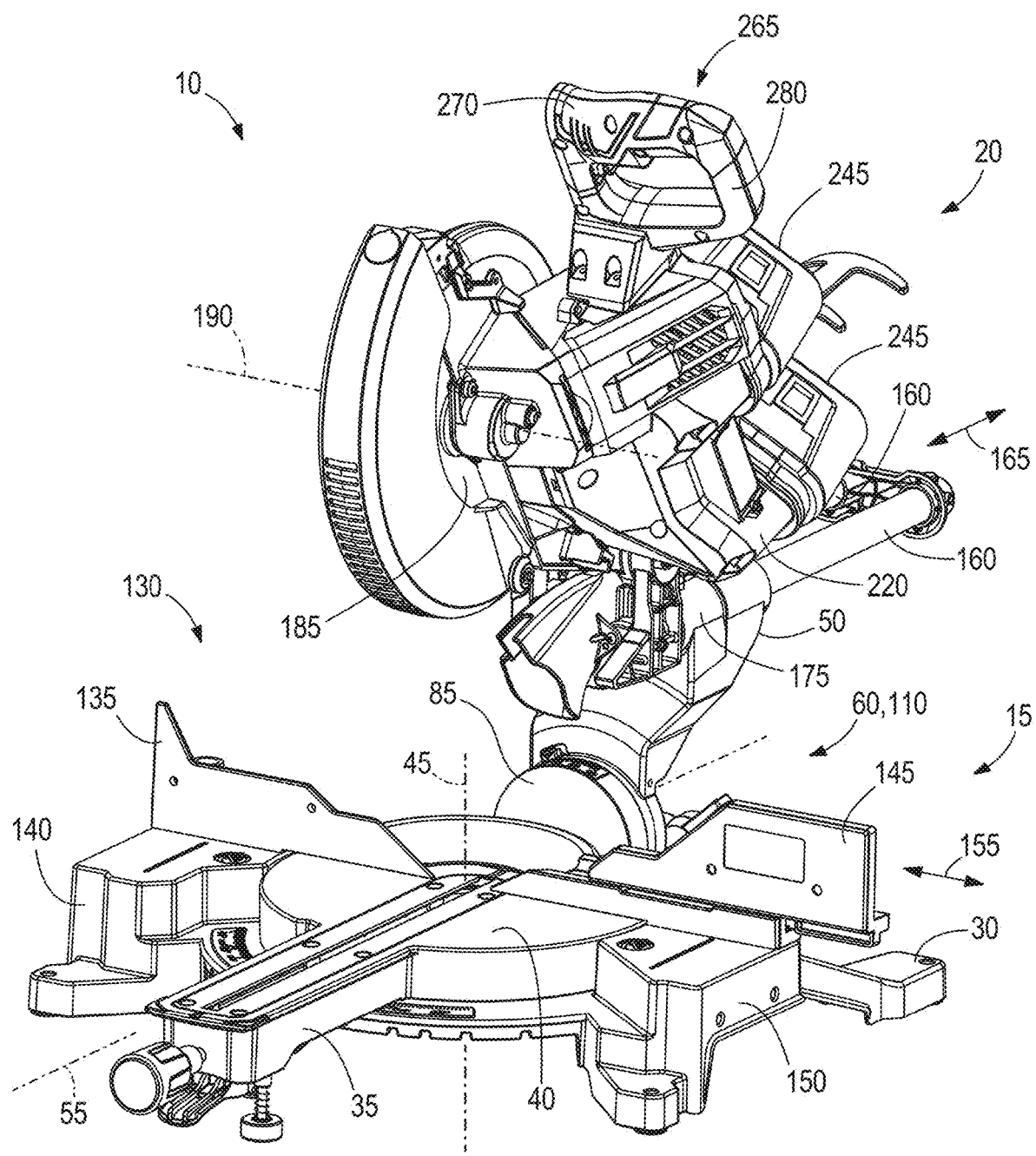
FIG. 1 is a front perspective view of a miter saw including a base assembly and a saw unit according to an embodiment of the invention.
Figure 2:
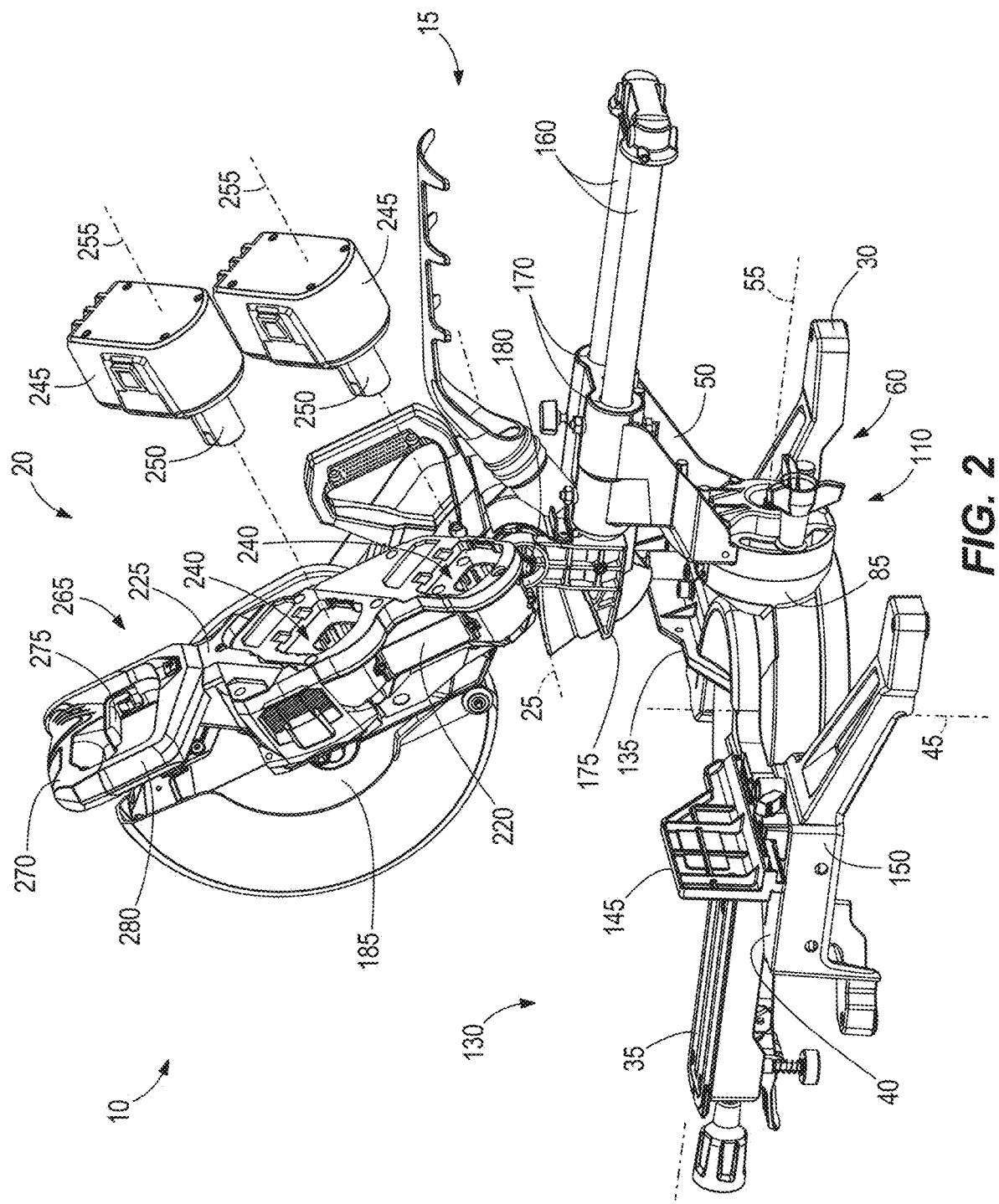
FIG. 2 is a rear perspective view of the miter saw of FIG. 1.

With reference to FIGS. 1 and 2, a miter saw 10 includes a base assembly 15 and a saw unit 20 pivotably coupled to the base assembly 15 about a horizontal chop axis 25. The base assembly 15 includes a base 30 and a turntable 35 that collectively define a work piece support surface 40. The turntable 35 is pivotably coupled to the base 30 about a vertical miter axis 45 for performing a first angled cut (e.g., a miter cut) with the saw unit 20 on a work piece supported on the work piece support surface 40. The turntable 35 and saw unit 20 are adjustable about the miter axis 45 to vary the miter angle of the saw unit 20 anywhere between a maximum left miter angle (e.g., 45 degrees) and a maximum right miter angle (e.g., 45 degrees).

Figure 3:
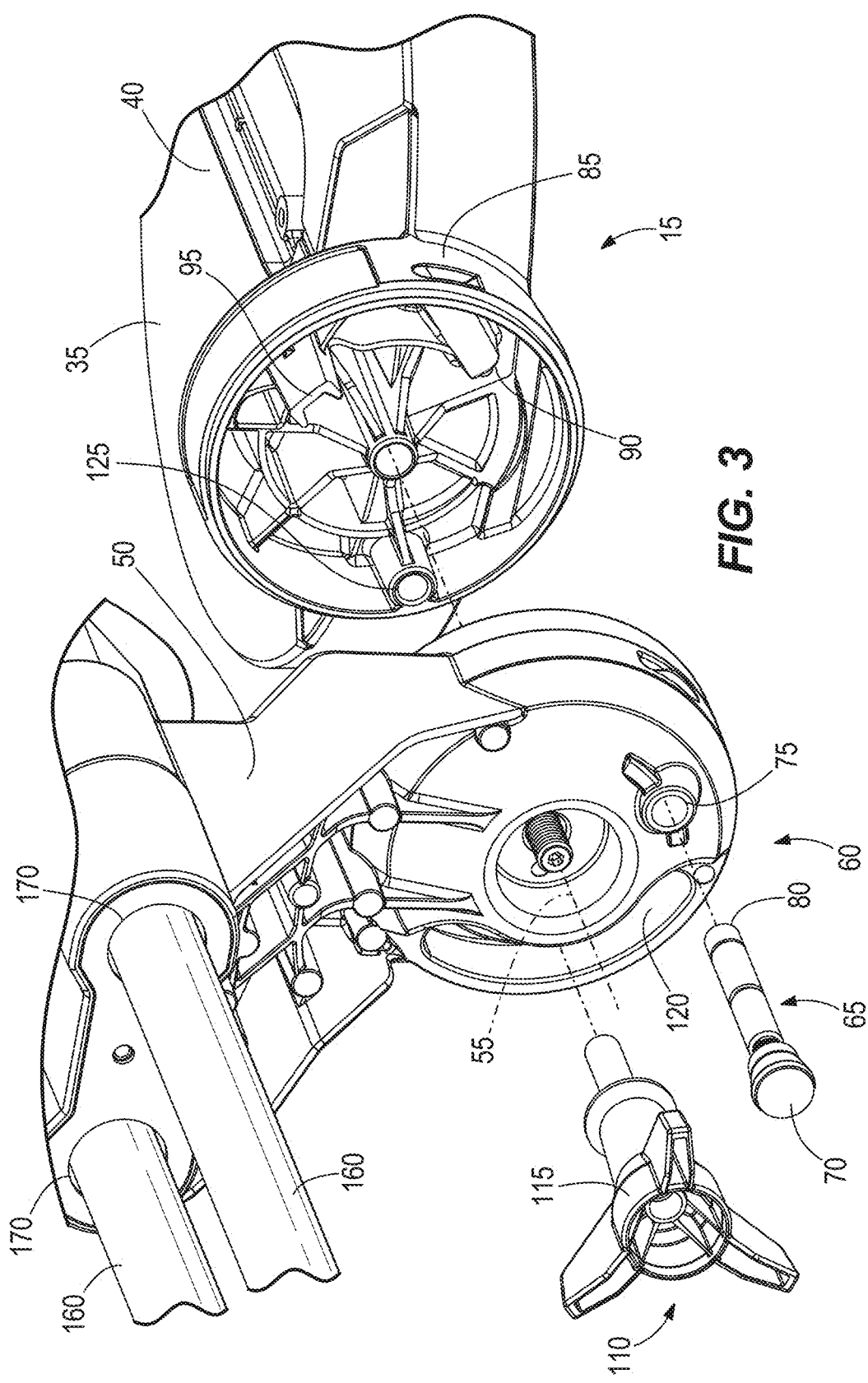
FIG. 3 is an enlarged and exploded, rear perspective view of the base assembly and a bevel arm of the miter saw of FIG. 1, illustrating a portion of a bevel angle lock mechanism and a bevel angle stop mechanism.
Figure 4:
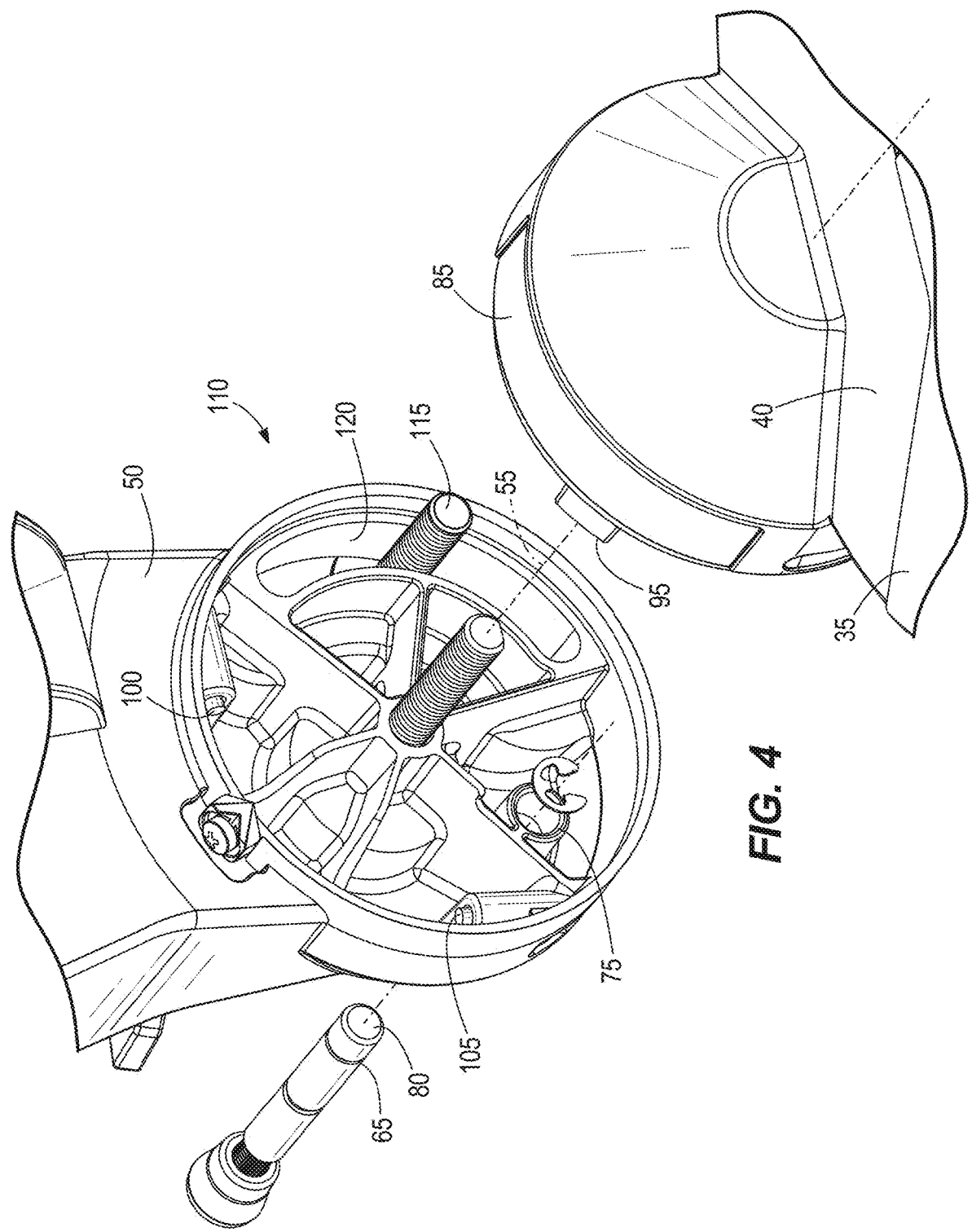
FIG. 4 is a front perspective view of the base assembly and the bevel arm shown in FIG. 3.
Figure 6:
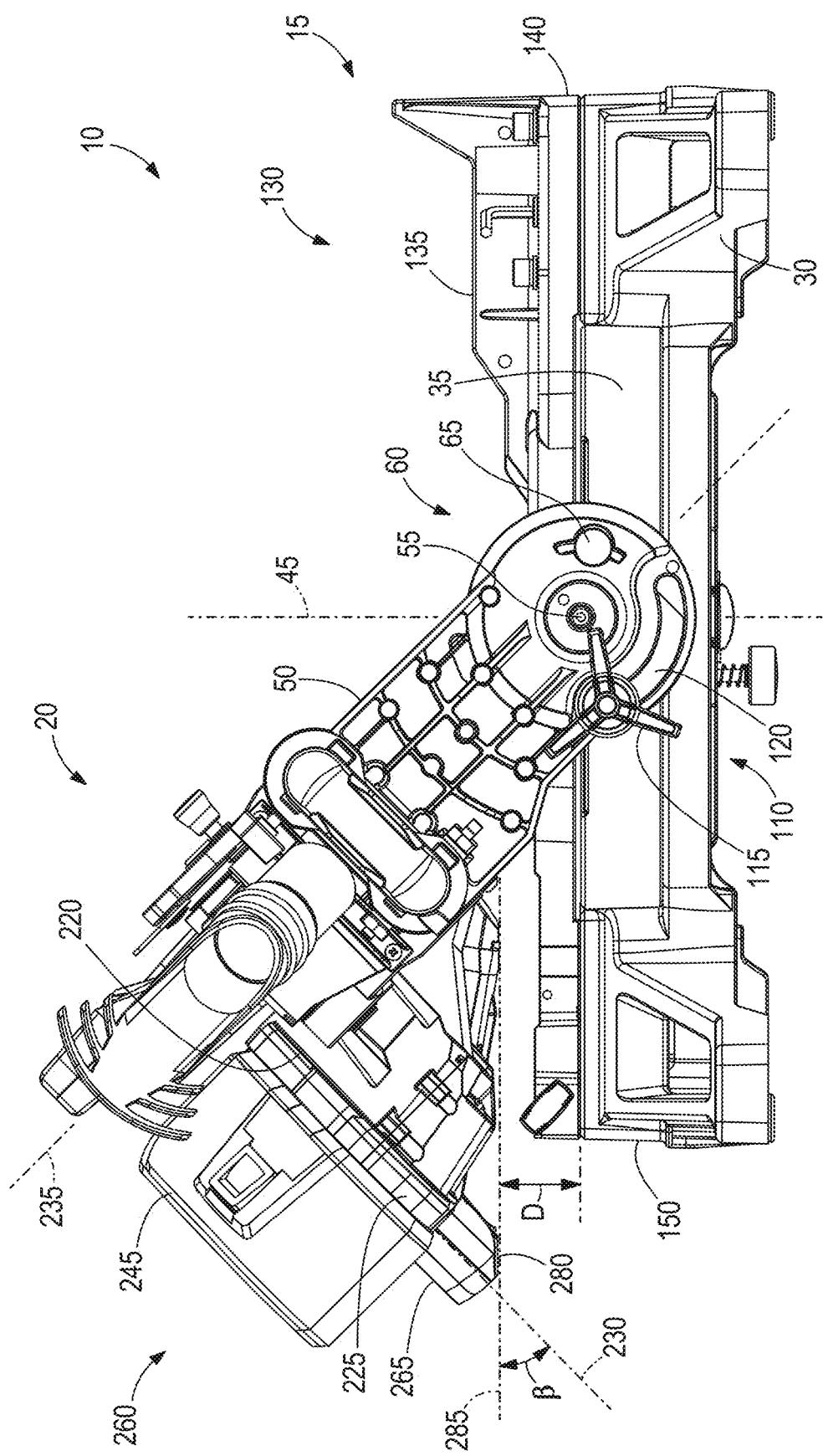
FIG. 6 is a rear view of the miter saw of FIG. 1 illustrating the saw unit positioned at a right bevel angle of about 45 degrees.

The miter saw 10 also includes a bevel arm 50 pivotably coupling the saw unit 20 to the turntable 35 about a horizontal bevel axis 55 for performing a second angled cut (e.g., a bevel cut) with the saw unit 20 on a work piece supported on the work piece support surface 40. With reference to FIGS. 3 and 4, the miter saw 10 also includes a bevel angle stop mechanism 60 for selectively limiting adjustment of the bevel angle anywhere between a maximum left bevel angle (e.g., 45 degrees) and a vertical bevel angle (e.g., 0 degrees), or anywhere between the maximum left bevel angle (e.g., 45 degrees) and a maximum right bevel angle (e.g., 45 degrees; FIG. 6). In the illustrated embodiment of the miter saw 10, the bevel angle stop mechanism 60 includes a pin 65 extending through an aperture 75 in the bevel arm 50 (FIGS. 3 and 4). The pin 65 includes a gripping portion 70 accessible by the user of the miter saw 10 to adjust the bevel angle of the saw unit 20, and a distal end 80 protruding into a bevel arm mount 85 affixed to the turntable 35. The bevel arm mount 85 includes a first stop 90 that is selectively engaged by the distal end 80 of the pin 65 coinciding with a vertical bevel angle of 0 degrees. In some embodiments of the miter saw 10, the pin 65 may be biased toward the bevel arm mount 85 by a spring, thereby positioning the distal end 80 of the pin 65 in a location where it would contact the first stop 90 in response to pivoting the bevel arm 50.

The illustrated bevel angle stop mechanism 60 also includes a protrusion 95 affixed to the bevel arm mount 85 and extending toward the bevel arm 50 (FIG. 3), a second stop 100 affixed to the bevel arm 50 (FIG. 4), and a third stop 105 affixed to the bevel arm 50 spaced 90 degrees circumferentially about the horizontal bevel axis 55. The stops 100, 105 are engageable with the protrusion 95 coinciding with the maximum left bevel angle (i.e., 45 degrees) and the maximum right bevel angle (i.e., 45 degrees), respectively. Specifically, engagement between the second stop 100 and the protrusion 95 coincides with the maximum left bevel angle, and engagement between the third stop 105 and the protrusion 95 coincides with the maximum right bevel angle.

Therefore, in the biased position of the pin 65, the distal end 80 is engageable with the first stop 90 and the protrusion 95 is engageable with the second stop 100 to limit adjustment of the bevel angle anywhere between the vertical bevel angle of 0 degrees and the maximum left bevel angle of 45 degrees. When the user pulls the pin 65 rearward to an extent where the distal end 80 clears the first stop 90, the bevel angle of the bevel arm 50 may be adjusted anywhere between the maximum left bevel angle of 45 degrees and the maximum right bevel angle of 45 degrees.

With continued reference to FIGS. 3 and 4, the miter saw 10 further includes a bevel angle lock mechanism 110 for securing the bevel arm 50 in any desired bevel angle between the maximum left and right bevel angles. The bevel angle lock mechanism 110 includes a threaded fastener 115 extending through an arcuate slot 120 in the bevel arm 50 and received in a corresponding threaded bore 125 in the bevel arm mount 85. The illustrated arcuate slot 120 spans an arc length of at least about 90 degrees about the bevel axis 55 to provide sufficient clearance for the bevel arm 50 to be adjusted between the maximum left and right bevel angles. By tightening the threaded fastener 115 into the threaded bore 125, a clearance which otherwise exists between the bevel arm 50 and the bevel arm mount 85 is closed, and a clamping force is exerted on the bevel arm 50 by a combination of the threaded fastener 115 and the bevel arm mount 85. The clamping force, in turn, creates a frictional force between the bevel arm 50 and the bevel arm mount 85 that prevents the bevel arm 50 from being pivoted about the bevel axis 55, thereby locking the bevel arm 50 and the saw unit 20 into a desired bevel angle.

With reference to FIGS. 1 and 2, the miter saw 10 also includes a fence assembly 130 against which a work piece on the work piece support surface 40 is abuttable during a cutting operation. The fence assembly 130 includes a stationary fence 135 affixed to a left side 140 of the base 30 and a removable fence 145 on a right side 150 of the base 30, with the miter axis 45 being positioned between the stationary fence 135 and the removable fence 145. The removable fence 145 is slidable relative to the base 30 in a direction 155 toward or away from the stationary fence 135 (e.g., in a direction transverse to the miter axis 45). To perform a cutting operation with the saw unit 20 pivoted to the maximum right bevel angle (i.e., 45 degrees), the removable fence 145 is detached and removed from the base 30 (FIG. 6).

As shown in FIGS. 1-3, the miter saw 10 further includes a pair of guide rails 160 interconnecting the saw unit 20 and the bevel arm 50 to permit the saw unit 20 to slide relative to the base assembly 15 in a direction 165 transverse to the chopping axis 25. In the illustrated embodiment of the miter saw 10, the guide rails 160 are supported within corresponding bores 170 in the bevel arm 50 by respective bearings (not shown) that facilitate sliding movement between the guide rails 160 and the bevel arm 50. And, the saw unit 20 is connected to the guide rails 160 by a saw unit mount 175, which includes a pivot joint 180 defining the chopping axis 25.

Figure 5:
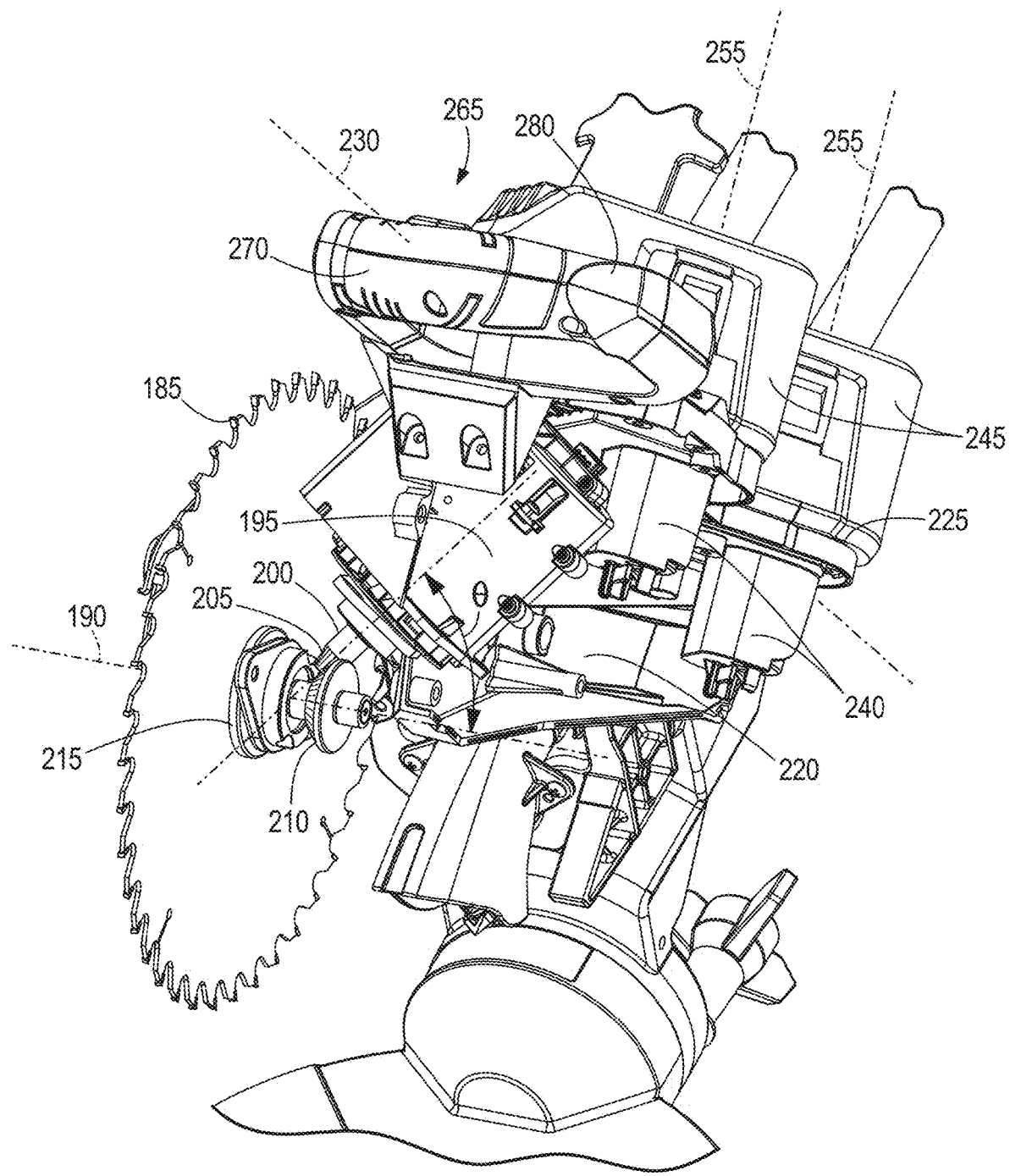
FIG. 5 is an enlarged perspective view of the saw unit of FIG. 1, with a portion of a motor housing being removed to expose a motor positioned therein.

With reference to FIG. 5, the saw unit 20 includes a saw blade 185 rotatable about a blade axis 190 parallel with the chop axis 25 and a motor 195 having an output shaft 200 inclined relative to the blade axis 190 by an oblique included angle θ. In the illustrated embodiment of the miter saw 10, the output shaft 200 has an integral pinion 205 enmeshed with a bevel gear 210 affixed to an arbor 215 of the saw blade 185. Alternatively, a different transmission or gear train may be used to connect the motor 195 and the saw blade 185. Also, in the illustrated embodiment of the miter saw 10, the motor 195 is a brushless direct current (i.e., DC) motor. However, in other embodiments of the miter saw 10, the motor 195 may be a brushed DC motor.

With reference to FIGS. 2 and 5, the saw unit 20 also includes a motor housing 220 in which the motor 195 is supported. The motor housing 220 includes a top surface 225 defining a plane 230 (FIG. 6) that is substantially transverse to a saw blade plane 235 which, in turn, is perpendicular to the blade axis 190. With reference to FIG. 2, the saw unit 20 further includes dual battery receptacles 240 on the top surface 225 of the motor housing 220 that are generally positioned between the blade axis 190 and the chop axis 25 viewed from a side of the miter saw 10. With reference to FIG. 2, the battery receptacles 240 are sized and configured to receive respective post-style battery packs 245, posts 250 of which are insertable into the respective battery receptacles 240 along parallel insertion axes 255 that are substantially transverse to the top surface plane 230. Accordingly, when installed, the battery packs 245 are located on the top surface 225 of the motor housing 220 in a side-by-side relationship. In the illustrated embodiment of the miter saw 10, the battery packs 245 are 18 volt lithium-ion power tool battery packs that are also usable with other power tools (e.g., drills, circular saws, and the like). The battery receptacles 240 are wired in series to provide the combined voltage of the batteries, 32 volts, to the motor 195 when activated. In other embodiments of the miter saw 10, battery packs 245 having different nominal voltages (e.g., 12 volts, 18 volts, 28 volts, etc.) may be used.

As shown in FIG. 6, the motor housing 220 and both battery packs 245 are positioned on a first side 260 of the saw blade plane 235. In other words, for example, when the saw unit 20 is pivoted to a right bevel angle of about 45 degrees, the motor housing 220 and both battery packs 245 are located between the saw blade plane 235 and the work piece support surface 40.

As shown in FIG. 1, the saw unit 20 further includes a handle 265 extending from the motor housing 220 having a gripping portion 270 located at a distal end thereof. The saw unit 20 also includes a trigger 275 on the gripping portion 270 of the handle 265, which activates the motor 195 in response to being depressed. Like the motor housing 220, the handle 265 is also positioned on the first side 260 of the saw blade plane 235. As shown in FIG. 6, the gripping portion 270 also includes a beveled edge 280 on the side of the handle 265 furthest from the saw blade plane 235. In the illustrated embodiment of the miter saw 10, the beveled edge 280 defines an angle β of about 45 degrees relative to the top surface plane 230 (FIG. 6).

When the saw unit 20 is positioned at the maximum right bevel angle (i.e., 45 degrees) as shown in FIG. 6, the beveled edge 280 of the gripping portion 270 is substantially parallel with the work piece support surface 40, with a distance D between the work piece support surface 40 and the beveled edge 280 being at least about 1.5 inches. The beveled edge 280 also defines a plane 285 that is substantially parallel with the work piece support surface 40 when the saw unit 20 is positioned at the maximum right bevel angle. In the illustrated embodiment of the miter saw 10, no portion of the motor housing 220 extends below the plane 285 of the beveled edge 280 when the saw unit 20 is pivoted to the maximum right bevel angle (i.e., 45 degrees), thereby leaving a clearance of at least about 1.5 inches to accommodate a work piece on the work piece support surface 40 to perform a cutting operation. Such a clearance is sufficient for work pieces having a nominal height of 2 inches (e.g., a 2×4, a 2×6, etc.), with which the miter saw 10 is commonly used.

Although the invention has been described in detail with reference to certain preferred embodiments, variations and modifications exist within the scope and spirit of one or more independent aspects of the invention as described.

What is claimed is:

1. A miter saw comprising:
   a base assembly including a support surface operable to support a work piece;
   a bevel arm pivotably coupled to the base assembly about a horizontal bevel axis;
   a saw unit pivotably coupled to the bevel arm about a horizontal chop axis, the saw unit including
      a saw blade rotatable about a blade axis parallel with the chop axis, the saw blade operable to cut the work piece,
      a motor having an output shaft inclined at an oblique included angle relative to the blade axis, and
      a motor housing in which the motor is supported, the motor housing having a receptacle on a top surface of the motor housing;
   at least one guide rail coupling the saw unit to the base assembly to permit the saw unit to slide relative to the base assembly in the direction of the bevel axis; and
   a battery supported within the receptacle of the motor housing and selectively electrically connectable with the motor to provide power to the motor;
   wherein the bevel arm and saw unit are pivotable relative to the base assembly, from an orientation in which the saw blade is substantially vertical, in both a first direction about the bevel axis by a bevel angle of at least about 45 degrees and an opposite, second direction by a bevel angle of at least about 45 degrees; and
   wherein the top surface of the motor housing is oriented substantially parallel to the support surface of the base assembly when the saw unit is positioned at a 0 degree bevel angle.

2. The miter saw of claim 1, wherein the saw blade defines a blade plane transverse to the blade axis, and wherein the motor housing is positioned on a first side of the blade plane.

3. The miter saw of claim 2, further comprising a handle extending from the motor housing and positioned on the first side of the blade plane, wherein the handle includes a gripping portion at a distal end thereof, and wherein the gripping portion is oriented substantially parallel to the blade axis.

4. The miter saw of claim 3, wherein the gripping portion of the handle includes a planar beveled edge that is substantially parallel with the support surface when the bevel arm and the saw unit are pivoted to a bevel angle of about 45 degrees in the first direction.

5. The miter saw of claim 4, wherein a distance between the support surface and the beveled edge is at least about 1.5 inches when the bevel arm and the saw unit are pivoted to a bevel angle of about 45 degrees in the first direction.

6. The miter saw of claim 4, wherein the beveled edge defines a plane that is substantially parallel with the support surface when the bevel arm and the saw unit are pivoted to a bevel angle of about 45 degrees in the first direction, and wherein no portion of the motor housing extends below the plane of the beveled edge when the bevel arm and the saw unit are pivoted to a bevel angle of about 45 degrees in the first direction.

7. The miter saw of claim 1, wherein the battery receptacle defines an insertion axis substantially transverse to a plane of the top surface along which a portion of the battery is receivable.

8. The miter saw of claim 1, wherein the battery is a first battery and wherein the receptacle is a first battery receptacle in which the first battery is received, wherein the miter saw further comprises a second battery receptacle on the top surface of the motor housing and a second battery received in the second battery receptacle, and wherein the second battery is selectively electrically connectable with the motor to provide power to the motor.

9. The miter saw of claim 8, wherein each of the first and second battery receptacles is positioned between the blade axis and the chop axis.

10. The miter saw of claim 8, wherein each of the first and second battery receptacles defines an insertion axis substantially transverse to a plane of the top surface, and wherein the insertion axes of the respective first and second battery receptacles are substantially parallel.

11. The miter saw of claim 1, wherein the motor is a brushless direct-current motor.

12. The miter saw of claim 1, wherein the base assembly includes a turntable that is pivotable about a vertical miter axis, and wherein the saw unit and the bevel arm are coupled to the turntable for movement therewith about the miter axis.

13. The miter saw of claim 12, wherein the turntable, the bevel arm, and the saw unit are pivotable in both a first direction about the miter axis by a miter angle of at least about 45 degrees and an opposite, second direction by a miter angle of at least about 45 degrees.

14. The miter saw of claim 13, further comprising a removable fence coupled to the base assembly on a first side of the miter axis and a stationary fence fixed to the base assembly on an opposite, second side of the miter axis, wherein the removable fence is slidable in a direction substantially transverse to the miter axis, and wherein the saw blade is positionable between the removable and stationary fences.

15. The miter saw of claim 14, wherein the removable fence is removed from the base assembly before the saw unit is positioned at the bevel angle of about 45 degrees in the first direction.

16. The miter saw of claim 1, wherein the guide rail is slidable relative to the bevel arm, and wherein the saw unit is coupled for movement with the guide rail.

17. The miter saw of claim 16, wherein the guide rail is a first guide rail, and wherein the miter saw further comprises a second guide rail parallel with the first guide rail and the bevel axis.

18. The miter saw of claim 1, further comprising a bevel angle lock mechanism for securing the bevel arm in a desired bevel angle, wherein the bevel angle lock mechanism includes a threaded fastener extending through an arcuate slot in the bevel arm and received in a corresponding threaded bore in the base assembly, and wherein the arcuate slot spans an arc length of at least about 90 degrees about the bevel axis.

19. The miter saw of claim 18, further comprising a bevel angle stop mechanism that is selectively adjustable to position the saw unit in at least a first orientation in which the saw blade is substantially vertical and a second orientation in which the saw unit is pivoted about the bevel axis to a bevel angle of about 45 degrees.

* * * * *